US012712322B2

(12) United States Patent
Ryu et al.

(10) Patent No.: US 12,712,322 B2
(45) Date of Patent: Aug. 18, 2026

(54) CONNECTOR ASSEMBLY INCLUDING A MAIN HOUSING FORMED FROM A NON-METAL MATERIAL

(71) Applicant: Tyco Electronics AMP Korea Co., Ltd., Gyeongsan (KR)

(72) Inventors: Seung Moon Ryu, Gyeongsan-Si (KR); Gi-Chan Kwon, Gyeongsan-Si (KR); Jae Hoon Kim, Gyeongsan-Si (KR)

(73) Assignee: TYCO ELECTRONICS AMP KOREA CO., LTD., Gyeongsan-Si (KR)

( * ) Notice: Subject to any disclaimer, the term of this patent is extended or adjusted under 35 U.S.C. 154(b) by 348 days.

(21) Appl. No.: 18/471,742

(22) Filed: Sep. 21, 2023

(65) Prior Publication Data

US 2024/0014611 A1 Jan. 11, 2024

Related U.S. Application Data

(63) Continuation of application No. PCT/IB2022/052496, filed on Mar. 18, 2022.

(30) Foreign Application Priority Data

Mar. 22, 2021 (KR) ........................ 10-2021-0036746
Mar. 23, 2021 (KR) ........................ 10-2021-0037362
(Continued)

(51) Int. Cl.
*H01R 24/40* (2011.01)
*H01R 13/52* (2006.01)

(52) U.S. Cl.
CPC ......... *H01R 24/40* (2013.01); *H01R 13/5202* (2013.01)

(58) Field of Classification Search
None
See application file for complete search history.

(56) References Cited

U.S. PATENT DOCUMENTS 5,026,302 A * 6/1991 Spencer ................. H01R 24/52 439/573
7,892,024 B1 2/2011 Chen
(Continued)

FOREIGN PATENT DOCUMENTS

JP 2018500733 A 1/2018
JP 2018098533 A 6/2018
(Continued)

OTHER PUBLICATIONS

International PCT Search Report and Written Opinion dated Jun. 17, 2022, corresponding with Application No. PCT/IB2022/052496, 7 pages.

(Continued)

*Primary Examiner* — Oscar C Jimenez

(57) ABSTRACT

A connector assembly includes a main housing, a shield case, a base plate and a shield ring. The main housing is formed from a non-metal material. The shield case is disposed inside the main housing. The base plate is adapted to be connected to a metal frame. The shield ring is connected to the main housing and the base plate. The shield ring is adapted to electrically connect the metal frame to the shield case.

21 Claims, 12 Drawing Sheets

(30) Foreign Application Priority Data

| | | | |
|---|---|---|---|
| Mar. 23, 2021 | (KR) | ........................ | 10-2021-0037365 |
| Oct. 20, 2021 | (KR) | ........................ | 10-2021-0140222 |
| Dec. 27, 2021 | (KR) | ........................ | 10-2021-0188208 |

(56) References Cited

U.S. PATENT DOCUMENTS

| | | | | |
|---|---|---|---|---|
| 11,018,458 | B2 | 5/2021 | Pan | |
| 2017/0271819 | A1* | 9/2017 | Hehir ................. | H01R 13/6583 |
| 2018/0006407 | A1* | 1/2018 | Sasaki .................... | H01R 24/40 |
| 2018/0164528 | A1 | 6/2018 | Sakamoto | |
| 2018/0166483 | A1 | 6/2018 | Sakamoto et al. | |
| 2020/0153171 | A1 | 5/2020 | Pan | |
| 2022/0115813 | A1* | 4/2022 | Tsuchiya .................. | H01R 9/05 |
| 2022/0368089 | A1* | 11/2022 | Kawanishi ......... | H01R 13/6584 |
| 2024/0243510 | A1* | 7/2024 | Tanaka ................. | H01R 13/512 |

FOREIGN PATENT DOCUMENTS

| | | | |
|---|---|---|---|
| JP | 2019133748 | A | 8/2019 |
| JP | 2020047369 | A | 3/2020 |
| JP | 2020092313 | A | 6/2020 |
| JP | 2020526888 | A | 8/2020 |
| KR | 1020200058038 | A | 5/2020 |
| WO | 2016087227 | A1 | 6/2016 |

OTHER PUBLICATIONS

Japanese Office Action dated Oct. 24, 2025 with English translation. corresponding to Application No. 2023-557328, 10 pages.

* cited by examiner

CONNECTOR ASSEMBLY INCLUDING A MAIN HOUSING FORMED FROM A NON-METAL MATERIAL

CROSS-REFERENCE TO RELATED APPLICATION

This application claims the priority benefit of International Application No. PCT/IB2022/052496, filed Mar. 18, 2022, which claims priority to Korean Patent Application No. 10-2021-0036746 filed on Mar. 22, 2021, and Korean Patent Application No. 10-2021-0037365 filed on Mar. 23, 2021, Korean Patent Application No. 10-2021-0037362 filed on Mar. 23, 2021, Korean Patent Application No. 10-2021-0140222 filed on Oct. 20, 2021, and Korean Patent Application No. 10-2021-0188208 filed on Dec. 27, 2021, in the Korean Intellectual Property Office, the disclosures of which are incorporated herein by reference for all purposes.

FIELD OF THE INVENTION

Embodiments of the present disclosure relate to the technical fields of electrical connectors and electrical connector assemblies.

BACKGROUND

A connector is an electrical component that enables or blocks an electrical connection. A connector used for connecting electrical components may include a socket functioning as a conductive signal path and a shield surrounding the socket. The shield may provide a return path and prevent a radio frequency (RF) from being leaked from the signal path.

A connector assembly is a component that selectively enables or blocks an electrical connection. For example, a vehicle includes various electrical components such as electronic components or sensors, and these electrical components are electrically connected to one another or a power supply through a cable and a connector assembly. A typical connector assembly may include a housing surrounding a connector. The housing may be formed with metal, which makes molding and processing of the connector assembly difficult. Thus, there is a need for a connector assembly including a connector housing formed with a non-metal material and configured to prevent external electromagnetic interference (EMI).

SUMMARY

According to an embodiment of the present disclosure, a connector assembly includes a main housing, a shield case, a base plate and a shield ring. The main housing is formed from a non-metal material. The shield case is disposed inside the main housing. The base plate is adapted to be connected to a metal frame. The shield ring is connected to the main housing and the base plate. The shield ring is adapted to electrically connect the metal frame to the shield case.

BRIEF DESCRIPTION OF THE DRAWINGS

The invention will now be described by way of example with reference to the accompanying Figures, of which.

DETAILED DESCRIPTION OF THE EMBODIMENTS

Figure 1:
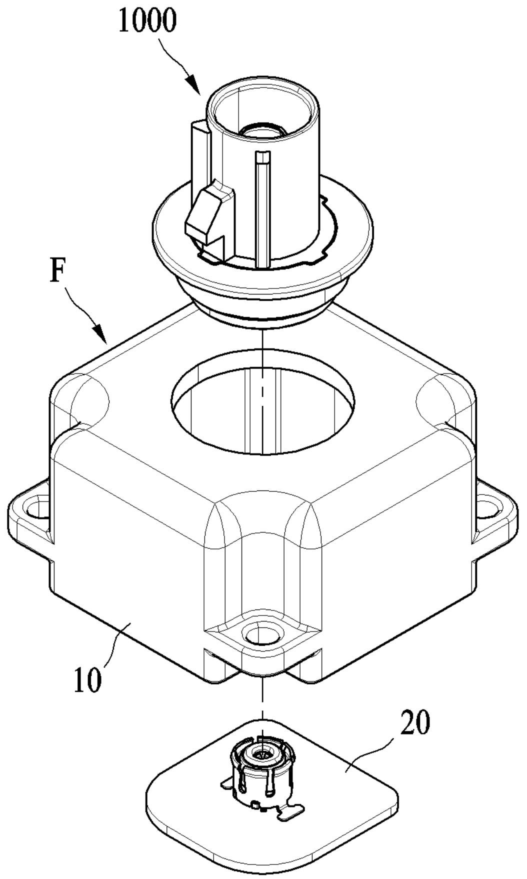
FIG. 1 is a perspective view of a connector assembly according to an exemplary embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a perspective view of a connector assembly according to an example embodiment. Referring to FIG. 1, according to an exemplary embodiment, a connector assembly 1000 may be connected to a metal frame F. The metal frame F may include a frame body 10 and a board 20. The connector assembly 1000 may be connected to, or combined with, the frame body 10 and connected to the board 20 provided inside the metal frame F. On an upper surface of the frame body 10 of the metal frame F, an opening to which the connector assembly 1000 is to be connected may be formed. The shape of the frame body 10 is not limited to the shape illustrated in FIG. 1.

Figure 2:
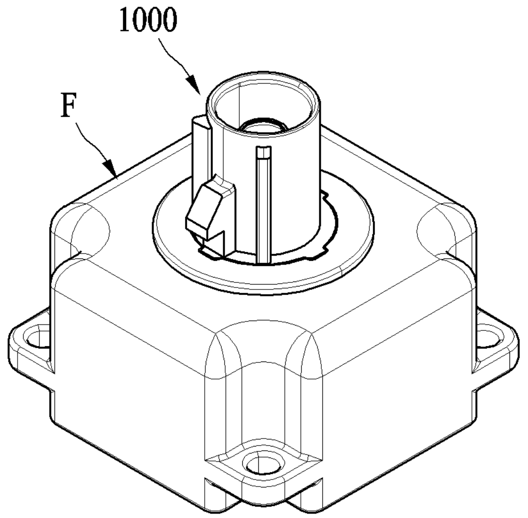
FIG. 2 is a perspective view of a connector assembly connected to a metal frame according to an exemplary embodiment.

FIG. 2 is a perspective view of the connector assembly connected to a metal frame according to an exemplary embodiment. Referring to FIG. 2, the connector assembly 1000 may be connected to the frame body 10 to be securely fixed thereto. Hereinafter, a mechanism through which the connector assembly 1000 is fixed will be described in detail with reference to FIGS. 3-10.

Figure 3:
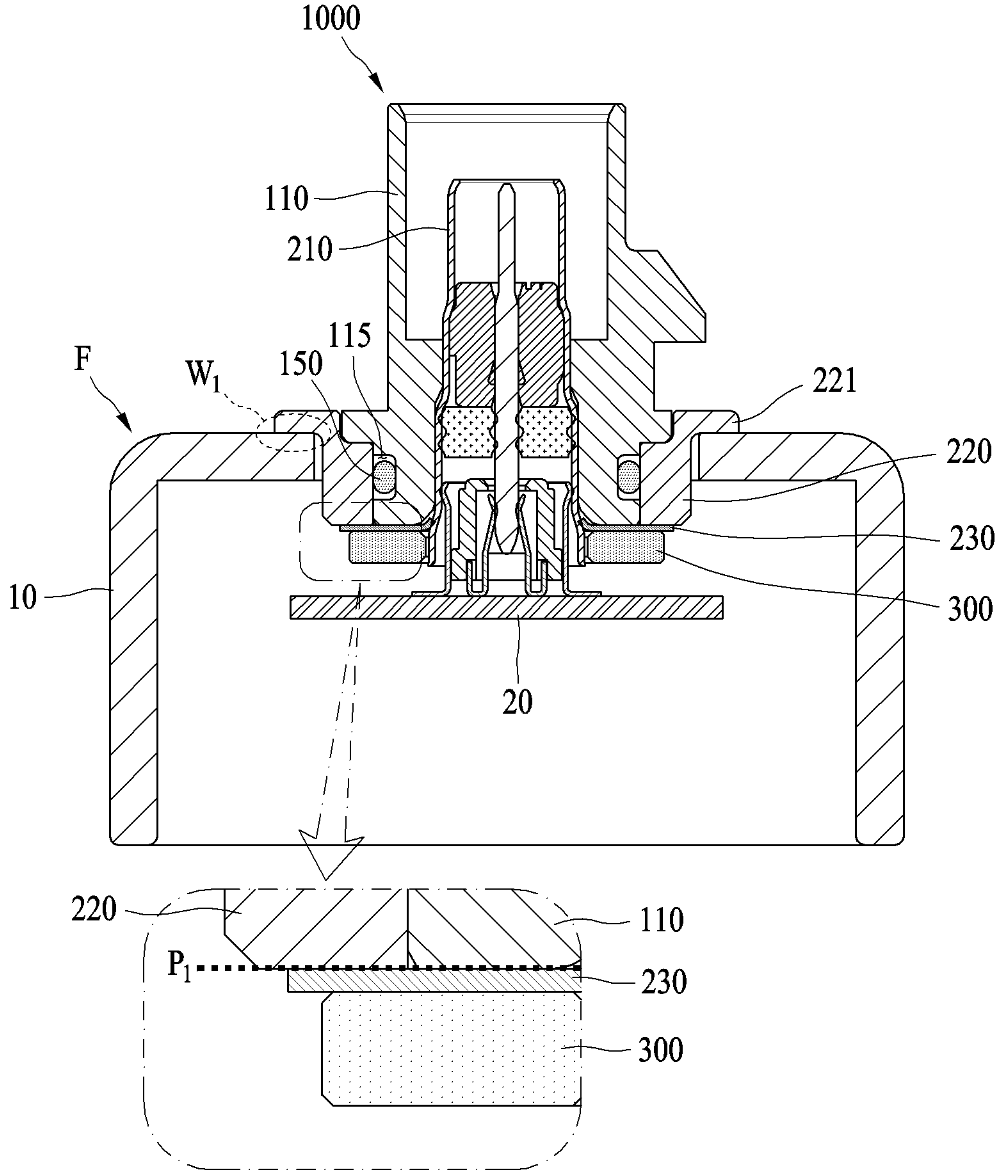
FIG. 3 is a cross-sectional view of a connector assembly connected to a metal frame according to an exemplary embodiment.

FIG. 3 is a cross-sectional view of a connector assembly connected to a metal frame according to an example embodiment. Referring to FIG. 3, the connector assembly 1000 may include a main housing 110, a shield case 210 disposed inside the main housing 110, a base plate 220 disposed outside the main housing 110 and configured to be connected to a metal frame F, a shield ring 230 disposed at a lower end of the main housing 110 and the base plate 220 and configured to block electromagnetic interference (EMI), and a cover 300 disposed under the shield ring 230 and configured to fix the shield ring 230. The main housing 110 of the connector assembly 1000 may be formed with a non-metal material (e.g., resin). The main housing 110 formed with the non-metal material may be readily processed and molded and may thus be deformed to match various shapes of various devices to which the connector assembly 1000 is to be connected as needed.

The main housing 110 may form a structural frame of the connector assembly 1000 as an outer surface of the main housing 110 contacts the base plate 220, an inner surface of the main housing 110 contacts the shield case 210, and one surface of the lower end of the main housing 110 contacts the shield ring 230. However, the main housing 110 is formed with the non-metal material and may thus not be electrically connected to the base plate 220, the shield case 210, and the shield ring 230.

The shield case 210 of the connector assembly 1000 may be disposed inside the main housing 110. An outer surface of the shield case 210 may contact the inner surface of the main housing 110. The shield case 210 may be formed with a metal material and configured to block EMI along with the base plate 220 and the shield ring 230 to be described hereinafter.

Components of a connector may be disposed inside the shield case 210. The components disposed inside the shield case 210 may be connected to a connector mounted on the board 20 provided inside the metal frame F. The shield case 210 may be formed in the shape of a pipe with a diameter increasing in a direction from an upper end toward a lower end. An opening may be formed at the upper end and the lower end of the shield case 210. In this case, the opening formed at the upper end may be connected to an external device, and the opening formed at the lower end may be connected to the board 20 in the metal frame F.

The base plate 220 of the connector assembly 1000 may be disposed outside the main housing 110. An inner end of the base plate 220 may contact an outer end of the main housing 110. The base plate 220 may include a plate body surrounding the main housing 110, and a rib or flange 221 protruding outward from the plate body and overlapping the metal frame F.

The rib 221 of the base plate 220 and the metal frame F may overlap in a height direction of the connector assembly 1000. The rib 221 of the base plate 220 overlapping the metal frame F may form a base plate-metal frame contact surface $W_1$, and a lower surface of the rib 221 and an upper surface of the metal frame F may be connected to (or combined with) each other through laser welding on the contact surface $W_1$. However, a method of connecting the rib 221 and the metal frame F is not limited to the foregoing. That is, the method of connecting performed on the contact surface W1 is not limited to laser welding, but other types of welding and other various connecting techniques including, for example, a mechanical method, may also be applied.

As the base plate 220 and the metal frame F are connected by being welded, the connector assembly 1000 and the metal frame F may be securely fixed to each other and, at the same time, electrically connected to each other, thereby preventing EMI to be described hereinafter. mIn addition, one surface of the lower end of the base plate 220 and one surface of the lower end of the main housing 110 may be disposed on the same plane, for example, a first plane $P_1$. The base plate 220 may be formed with a metal material and may thus block EMI along with the shield case 210 described above and the shield ring 230 to be described below.

The shield ring 230 of the connector assembly 1000 may be disposed under the main housing 110 and the base plate 220. An upper surface of the shield ring 230 may be disposed on the first plane $P_1$ on which one surface of the lower end of the base plate 220 and one surface of the lower end of the main housing 110 are disposed. The shield case 210 described above may be disposed by passing through a hole formed at a central portion of the shield ring 230, and the shield ring 230 may extend inward while being in contact with the base plate 220 and the main housing 110 on the first plane $P_1$ to be in contact with an outer wall of the shield case 210. The shield ring 230 may be formed with a metal material and may thus be electrically connected to the base plate 220 and the shield case 210 that are electrically connected to the metal frame F to block or reduce EMI. A detailed shape of the shield ring 230 will be described hereinafter with reference to FIG. 5.

The cover 300 of the connector assembly 1000 may be disposed under the shield ring 230. An upper surface of the cover 300 may be in contact with the lower surface of the shield ring 230 to securely fix the shield ring 230 to the main housing 110 and the base plate 220. The cover 300 may be formed with a non-metal material and may be welded to the main housing 110 to fix the shield ring 230 to the lower surface of the main housing 110. A detailed mechanism through which the shield ring 230 is fixed by the cover 300 will be described hereinafter with reference to FIG. 6.

The connector assembly 1000 may further include a seal 150 disposed between the main housing 110 and the base plate 220. The seal 150 may be formed to prevent a foreign substance (e.g., water) from flowing from the outside. In this case, the seal 150 may be an elastic member, for example, O-ring, that may be compressed between the main housing 110 and the base plate 220. The main housing 110 may include a groove 115 for receiving therein the seal 150. The groove 115 may be formed by being recessed by a preset height and width from an outer wall of the main housing 110 in contact with the base plate 220. The seal 150 may be compressed between the base plate 220 and the main housing 110 while being accommodated in the groove 115 of the main housing 110 to remove a void between the base plate 220 and the main housing 110 and securely be sealed between the base plate 220 and the main housing 110.

Figure 4:
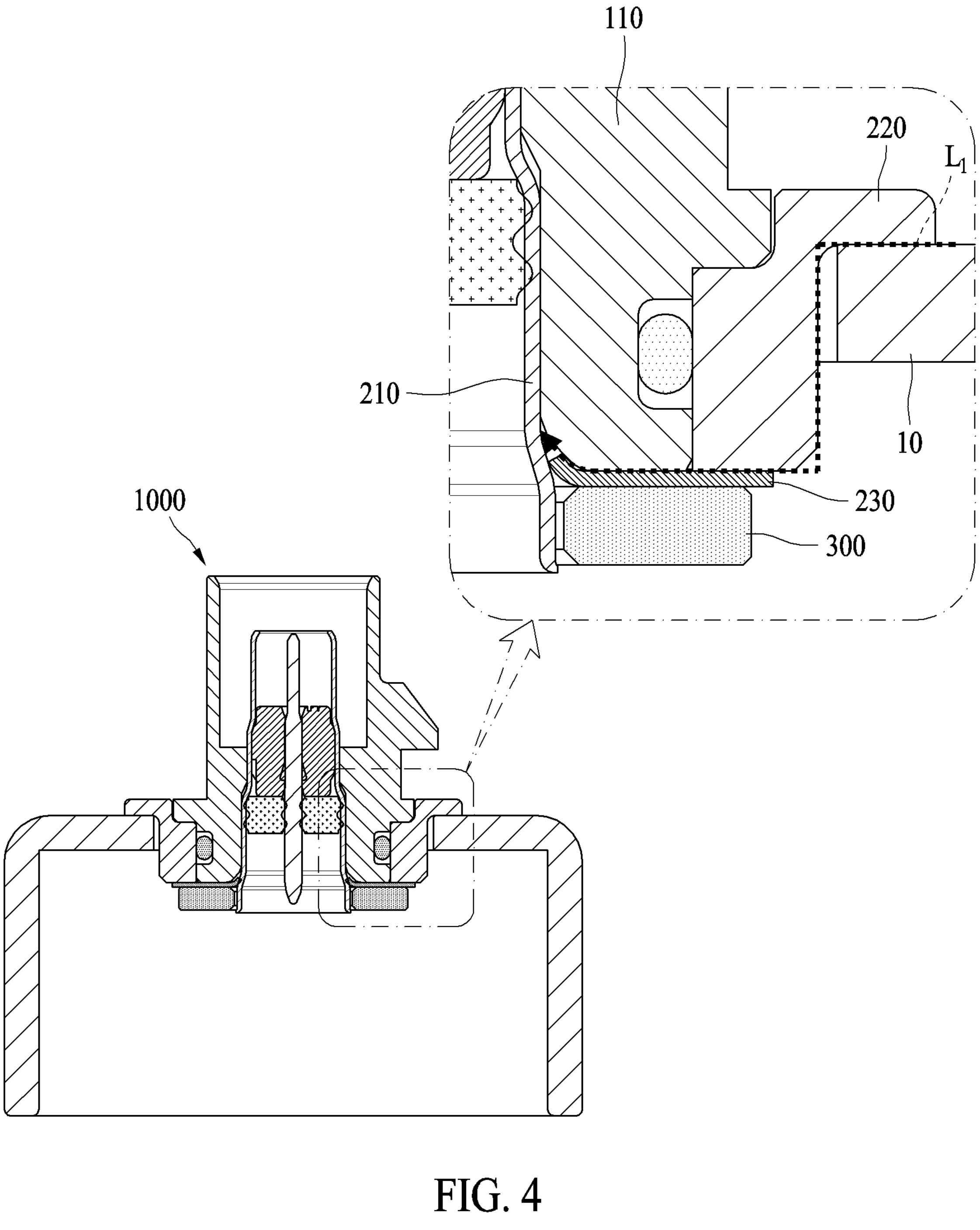
FIG. 4 illustrates an electrically connected state of a connector assembly connected to a metal frame according to an exemplary embodiment.

FIG. 4 illustrates an electrical connected state of a connector assembly connected to a metal frame according to an example embodiment. As described above, the main housing 110 may be formed with a non-metal material, whereas the base plate 220, the shield case 210, and the shield ring 230 may be formed with a metal material. The base plate 220, the shield case 210, and the shield ring 230 formed of a metal material may be electrically connected while being in contact with each other, and may thus electromagnetically shield the inside of the shield case 210 connected to the metal frame F from the outside.

An upper surface of the frame body 10 of the metal frame F may overlap a rib (e.g., the rib 221) of the base plate 220, and the metal frame F and the base plate 220 may be electrically connected. One surface of the lower end of the base plate 220 may contact the shield ring 230 to be electrically connected thereto, and an inner end of the shield ring 230 may contact an outer wall of the shield case 210 to be electrically connected thereto. In this case, the shield ring 230 and the shield case 210 may be electrically connected while being in physical contact with each other, and thus the inner end of the shield ring 230 and the shield case 210 may need to maintain a stable contact state therebetween. Thus, the inner end of the shield ring 230 may be formed in a shape slanted upward with respect to the outer wall of the shield case 210. A detailed shape of the inner end of the shield ring 230 will be described hereinafter with reference to FIG. 7.

Thus, an electrical connection line $L_1$ extending from the frame body 10 of the metal frame F to the shield case 210 inside may be formed, and the inside and the outside may be electromagnetically shielded by a boundary line defined by the connection line $L_1$ and a sidewall of the shield case 210. That is, the inside of the connector assembly 1000 may be protected from EMI, which is, for example, a state where noise generated in an electronic device interferes with another electronic device.

Figure 5:
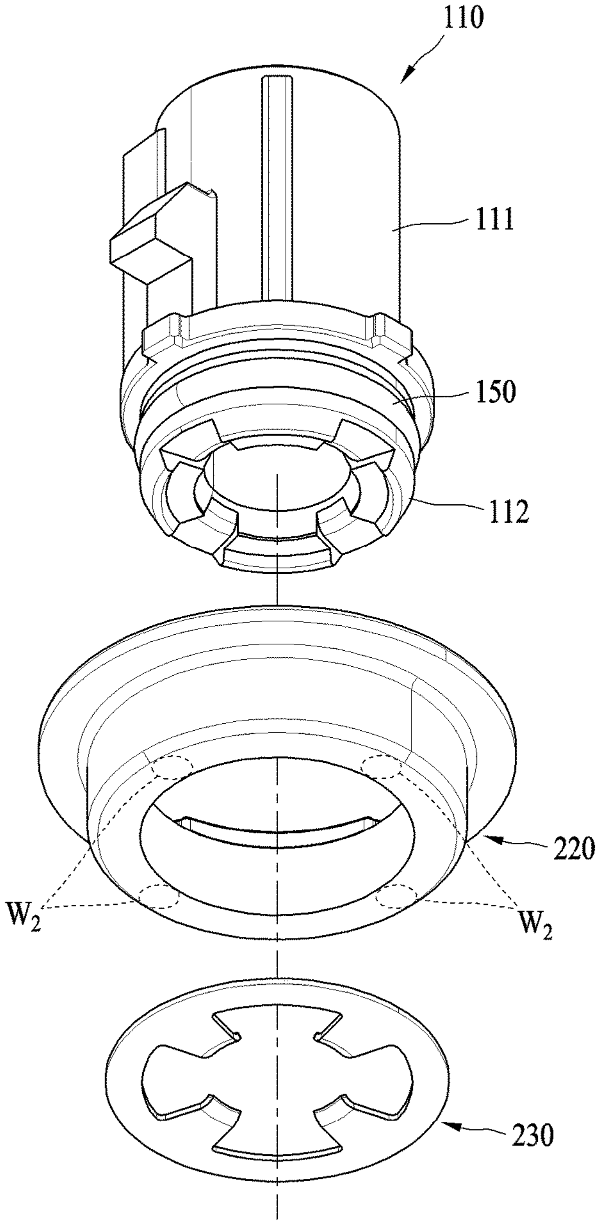
FIG. 5 is an exploded perspective view of a connector assembly in which a main housing, a base plate, and a shield ring are to be connected according to an exemplary embodiment.

FIG. 5 is an exploded perspective view of a connector assembly in which a main housing, a base plate, and a shield ring are to be connected according to an example embodiment. Referring to FIG. 5, the base plate 220 may be connected in a direction of a lower side of the main housing 110, and the shield ring 230 may then be connected to a lower surface of the base plate 220.

In this case, an upper surface of the shield ring 230 may contact the lower surface of the base plate 220. In addition, the upper surface of the shield ring 230 and the lower surface of the base plate 220 that are in contact with each other may be fixed through spot welding at a welding spot $W_2$ formed on a portion of the lower surface of the base plate 220. Spot welding may be a collective term referring to all welding methods of attaching through plastic deformation of a basic material or parent metal.

Figure 6:
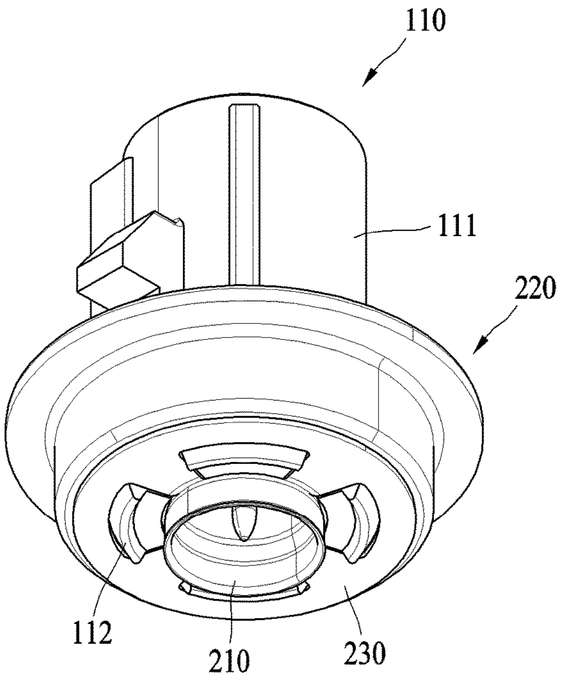
FIG. 6 is a perspective view of a connector assembly in which a main housing, a base plate, and a shield ring are connected according to an exemplary embodiment.

FIG. 6 is a perspective view of a connector assembly in which a main housing, a base plate, and a shield ring are connected according to an example embodiment. Referring to FIG. 6, the main housing 110 may include a main housing body 111 disposed on an upper surface of the shield ring 230, and a housing protrusion 112 provided in the form of a cantilever having an elastic force that protrudes from the main housing body 111 by passing through the shield ring 230. The main housing protrusion 112 may contact the cover 300 (to be described hereinafter) to be fixed. In the case in which the main housing 110 is connected to the base plate 220 and the shield ring 230, the shield case 210 disposed inside the main housing 110 and the main housing protrusion 112 may be disposed by passing through the shield ring 230.

The base plate 220 and the shield ring 230 may be fixed to each other through spot welding. In addition, the main housing 110 may be fixed as the main housing protrusion 112 is elastically connected to an inner side of the shield ring 230, and may be mechanically fixed to an outer surface of the shield ring 230 using a stepped portion formed at an end of the main housing protrusion 112. To increase such a connecting force, the cover 300 may be additionally fixed to the main housing 110. A detailed mechanism through which the main housing 110 is fixed will be described hereinafter with reference to FIGS. 8 and 9.

Figure 7:
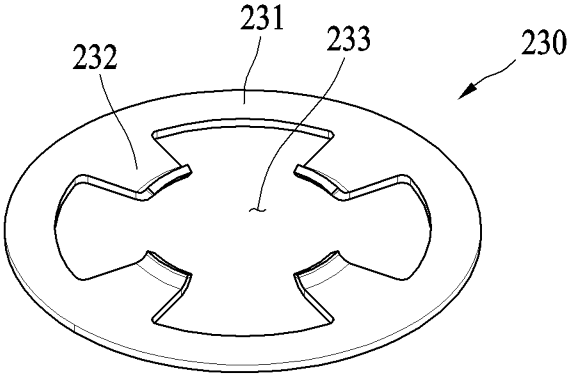
FIG. 7 is perspective view of a shield ring of a connector assembly according to an exemplary embodiment.

FIG. 7 is perspective view of a shield ring of a connector assembly according to an example embodiment. Referring to FIG. 7, the shield ring 230 may include a shield ring body 231 configured to contact the base plate 220 and the shield case 210, and a shield ring protrusion 232 extending from an inner end of the shield ring body 231 and configured to contact the shield case 210.

An inner end of the shield ring protrusion 232 may be formed in a shape slanted upward with respect to the shield ring body 231. The inner end of the shield ring protrusion 232 formed in such a slanted shape may improve stability of contact with the shield case 210. A direction in which the shield ring protrusion 232 is slanted may be the same as a direction in which the shield case 210 is inserted in the main housing 110. A hole 233 may be formed in a central portion of the shield ring 230, and the shield case 210 and the main housing protrusion 232 may be disposed by passing through the hole 233 as described above.

Figure 8:
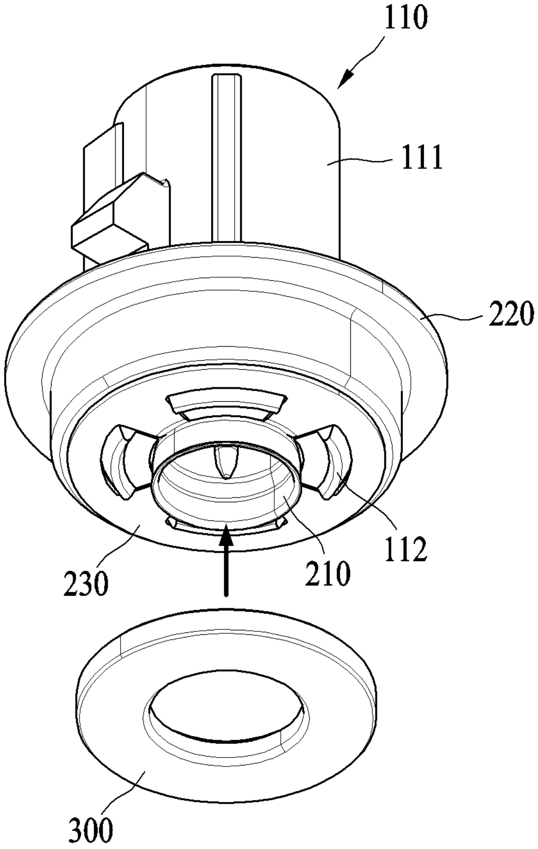
FIG. 8 is an exploded perspective view of a connector assembly in which a cover is to be connected according to an exemplary embodiment.

FIG. 8 is an exploded perspective view of a connector assembly in which a cover is to be connected according to an example embodiment. Referring to FIG. 8, the cover 300 may be disposed under the shield ring 230, and an upper surface of the cover 230 may contact a lower surface of the shield ring 230 to be connected thereto. In this case, the main housing protrusion 112 protruding on a lower surface of the main housing 110 may contact the upper surface of the cover 300. The main housing protrusion 112 and the upper surface of the cover 300 may be connected by being welded in a contact portion, and the cover 300 connected and fixed to the main housing 110 may further increase a mutual fixing force between the shield ring 230 disposed on the cover 300 and the main housing 110.

Figure 9:
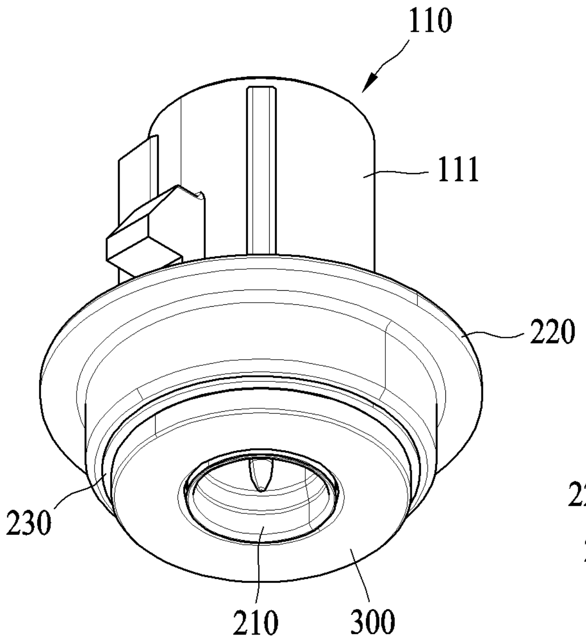
FIG. 9 is a perspective view of a connector assembly in which a cover is connected according to an exemplary embodiment.

FIG. 9 is a perspective view of a connector assembly in which a cover is connected according to an example embodiment. Referring to FIG. 9, in a connected state, the shield case 210 may be disposed by passing through a hole formed in a central portion of the shield ring 230 and then passing through a cover hole formed in a central portion of the cover 300. That is, the base plate 220, the shield ring 230, and the cover 300 may be sequentially arranged in a direction from an upper side toward a lower side, and the shield case 210 may protrude downward while passing through the foregoing components sequentially.

Figure 10:
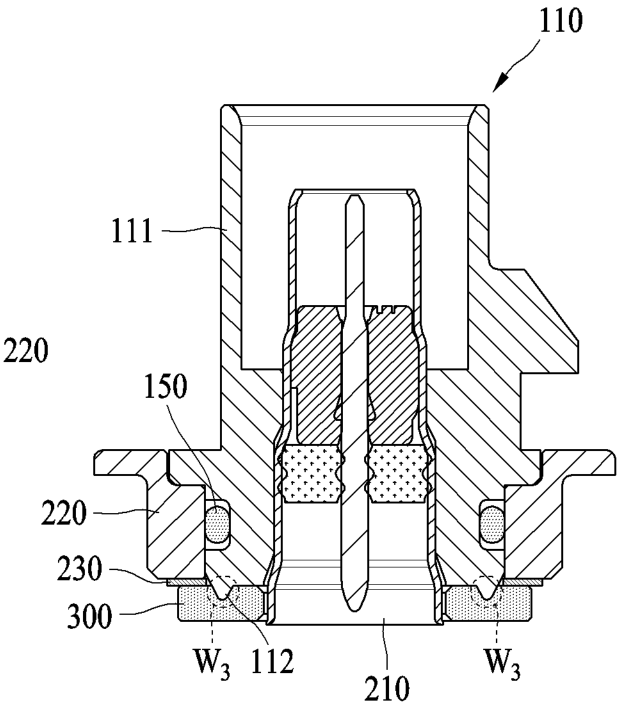
FIG. 10 is a cross-sectional view of a connector assembly in which a cover is connected according to an exemplary embodiment.

FIG. 10 is a cross-sectional view of a connector assembly in which a cover is connected according to an example embodiment. Referring to FIG. 10, the main housing protrusion 112 may pass through a hole formed in a central portion of the shield ring 230 to contact an upper surface of the cover 300. In this case, a contact portion $W_3$ between an upper surface of the cover 300 and the main housing protrusion 112 may be fixed through ultrasonic welding. Ultrasonic welding may refer to a welding method performed by bringing two target materials to be welded into contact with an oscillating rod that vibrates at an ultrasonic frequency under high pressure and generating shear stress. The main housing protrusion 112 and the cover 300 may be fixed as they are welded through ultrasonic welding, and the main housing 110, the base plate 220, and the shield ring 230 may be securely engaged to be fixed without movements.

Hereinafter, a connector assembly to which a first fixing mechanism described above is applied will be described. Further, a connector assembly to which a second fixing mechanism, a third fixing mechanism, or a fourth fixing mechanism is applied will be described with reference to FIGS. 11 through 20. Technical features of the main housing 110, the base plate 220, and the shield ring 230 to be described hereinafter, except for a fixing mechanism, may be the same as what has been described above regarding a connector assembly according to an example embodiment, but examples of which are not limited thereto.

Figure 11:
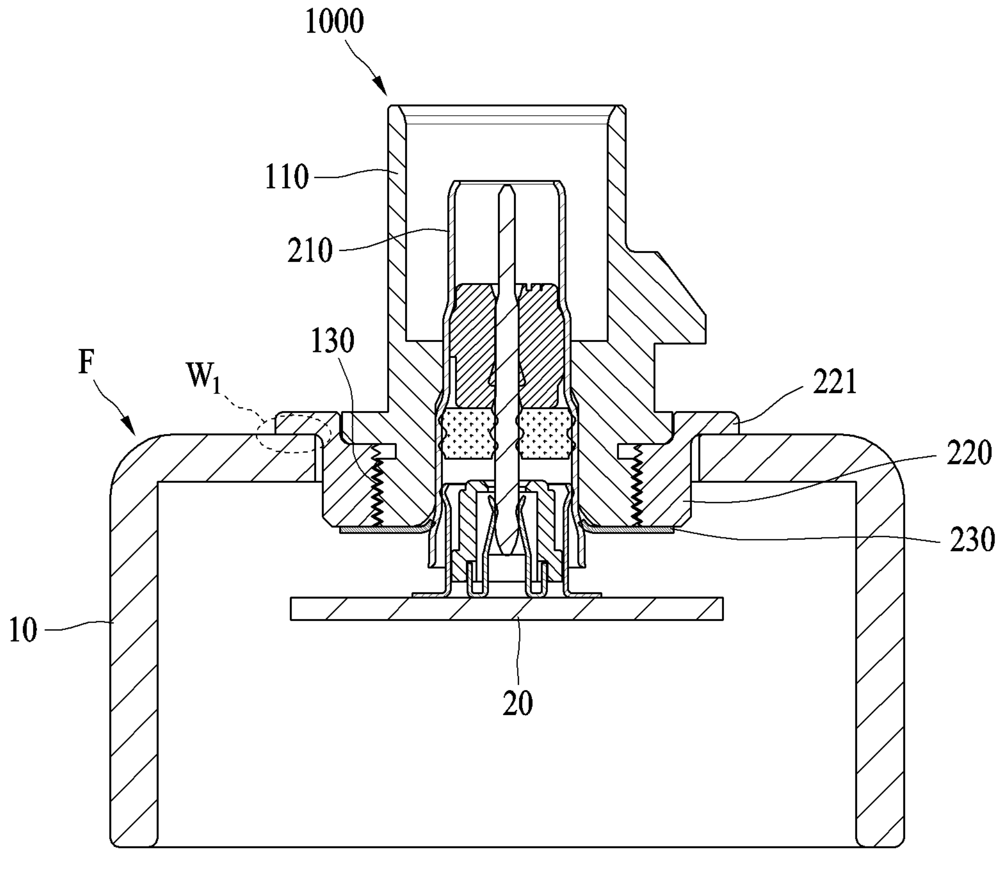
FIG. 11 is a cross-sectional view of a connector assembly based on a second fixing mechanism according to an exemplary embodiment.

FIG. 11 is a cross-sectional view of a connector assembly based on a second fixing mechanism according to an example embodiment. Referring to FIG. 11, the connector assembly 1000 may include a screw thread 130 formed on each of an outer surface of the main housing 110 and an inner surface of the base plate 200 facing the outer surface of the main housing 110. The main housing 110 and the base plate 220 may be securely engaged through the screw thread 130 to be mutually fixed. In this case, a lower surface of the rib 221 of the base plate 220 may contact an upper surface of a metal frame F and be welded through laser welding on a contact surface $W_1$, as described above.

Figure 12:
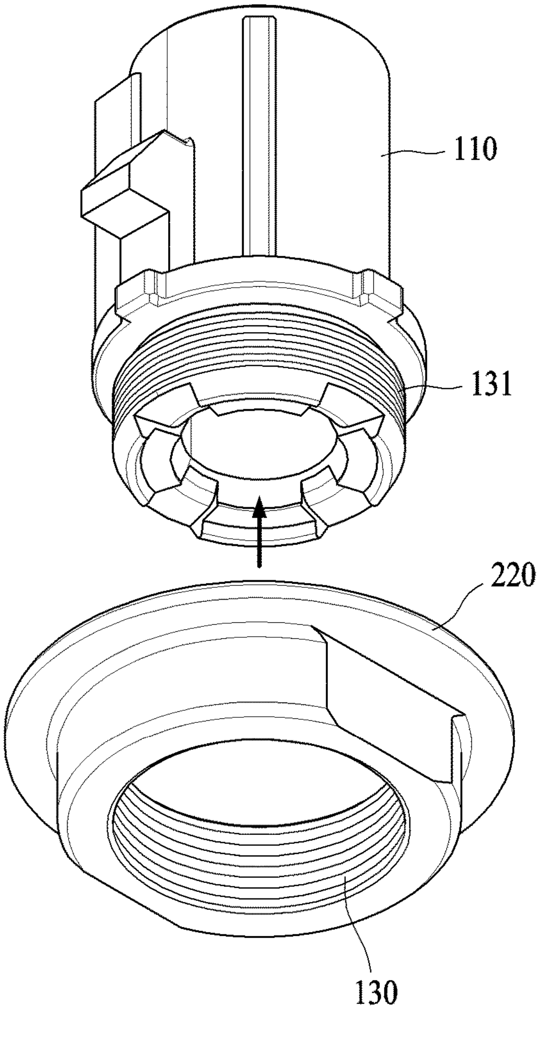
FIG. 12 is an exploded perspective view of a connector assembly in which a main housing and a base plate are connected through a second fixing mechanism according to an exemplary embodiment.

FIG. 12 is an exploded perspective view of a connector assembly in which a main housing and a base plate are connected through a second fixing mechanism according to an example embodiment. Referring to FIG. 12, the base plate 220 may be connected to the main housing 110 through the screw thread 130 formed on an inner surface of the base plate 220. The main housing 110 may include a seal 131 overlapped on a screw thread on an outer surface of the main housing 110 facing the inner surface of the base plate 220. The seal 131 may prevent an external foreign substance (e.g., water) from flowing in the connector assembly 1000, and may be an elastically deformable elastic member (e.g., silicone (Si)). As the screw thread of the main housing 110 and the screw thread 130 of the base plate 220 are engaged, the seal 131 may be compressed therebetween to remove a void, thereby securely sealing the main housing 110 and the base plate 220.

Figure 13:
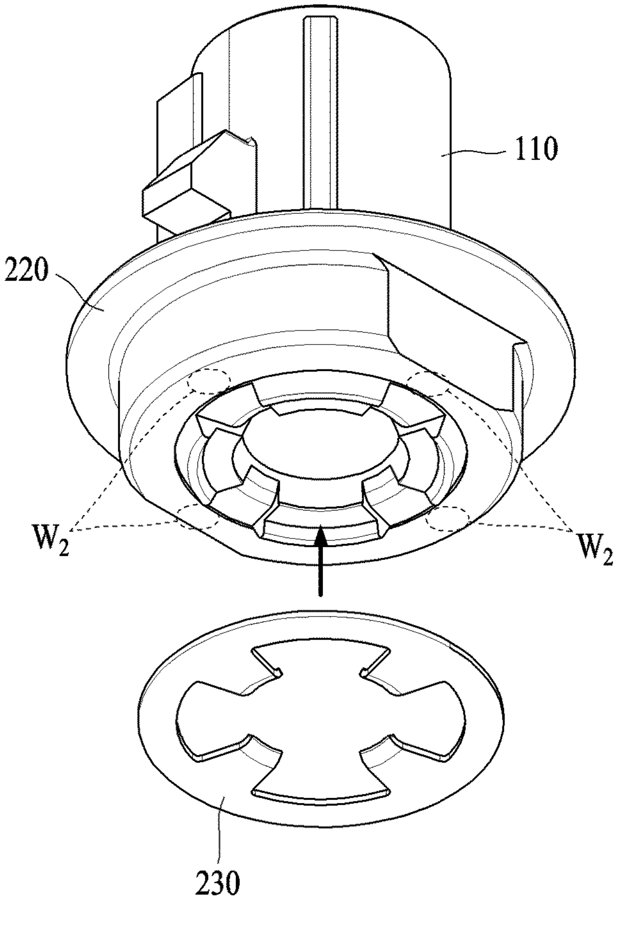
FIG. 13 is an exploded perspective view of a connector assembly in which a base plate and a shield ring are to be connected according to an exemplary embodiment.

FIG. 13 is an exploded perspective view of a connector assembly in which a base plate and a shield ring are to be connected according to an example embodiment. Referring to FIG. 13, an upper surface of the shield ring 230 may contact a lower surface of the base plate 220 to be connected thereto. The upper surface of the shield ring 230 and the lower surface of the base plate 220 may be fixed through spot welding at a welding spot $W_2$ formed in a portion of the lower surface of the base plate 220, as described above. The main housing 110 may be connected to the base plate 220 as they are engaged through a screw thread, and the base plate 220 may be connected to the shield ring 230 through spot welding. Thus, the main housing 110, the base plate 220, and the shield ring 230 may be mutually and securely fixed. An electrical connection between the shield case 210 and the frame body 10 is as described above.

Figure 14:
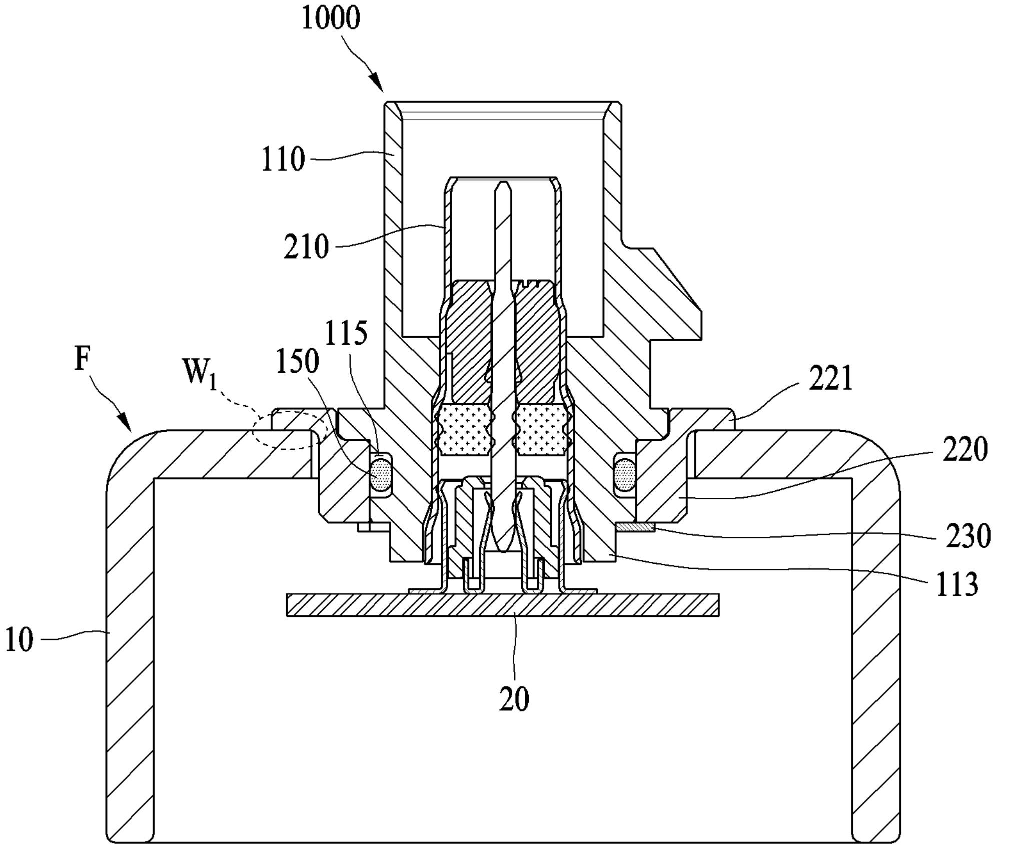
FIG. 14 is a cross-sectional view of a connector assembly based on a third fixing mechanism according to an exemplary embodiment.

FIG. 14 is a cross-sectional view of a connector assembly based on a third fixing mechanism according to an example embodiment. Referring to FIG. 14, the main housing 110 of the connector assembly 1000 may include a connecting protrusion 113 formed under the main housing 110. The shield ring 230 may be connected and fixed to the main housing 110 as it is connected to the connecting protrusion 113. In this case, a lower surface of the rib 221 of the base plate 22 may contact an upper surface of a metal frame F and be welded through laser welding on a contact surface $W_1$, as described above.

Figure 15:
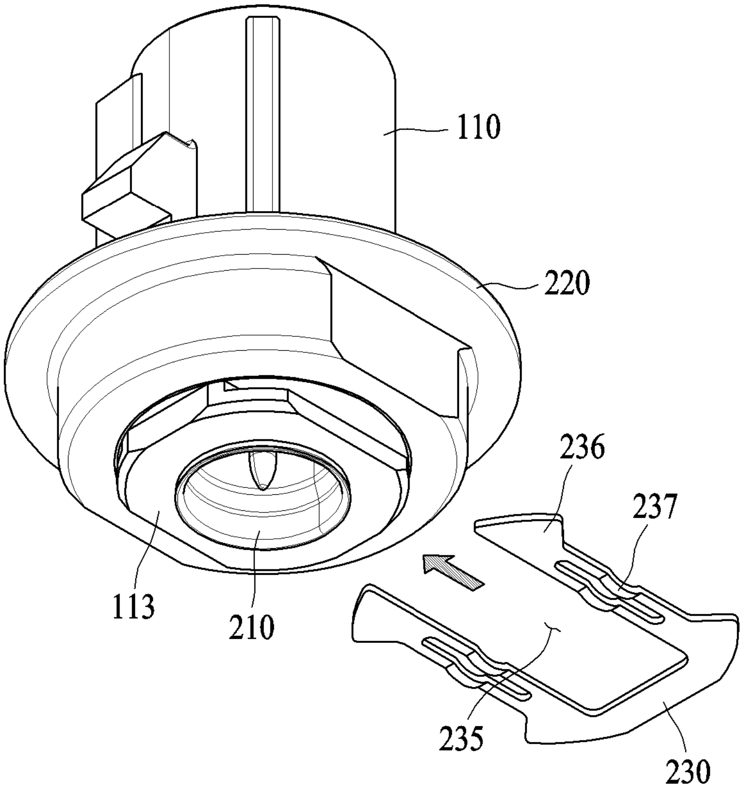
FIG. 15 is an exploded perspective view of a connector assembly in which a main housing, a shield case, a base plate, and a shield ring are to be connected through a third fixing mechanism according to an exemplary embodiment.

FIG. 15 is an exploded perspective view of a connector assembly in which a main housing, a shield case, a base plate, and a shield ring are to be connected through a third fixing mechanism according to an example embodiment. Referring to FIG. 15, the connecting protrusion 113 formed on a lower side of the main housing 110 may protrude downward by passing through the base plate 220. Here, the shield ring 230 formed in a preset shape suitable for the connection may be connected and fixed in a way sliding to a space formed in the connecting protrusion 113. The connecting protrusion 113 may be provided in a guide shape for guiding the shield ring 230.

To allow the shield ring 230 to slide and be connected to the connecting protrusion 113, the shield ring 230 may include a shield ring opening 235 that opens to one side, a pair of shield ring arms 236, and a shield ring fastening portion 237 formed in a central portion of the shield ring arms 236. At least a portion of the shield case 210 may be externally exposed through the main housing 110 and be electrically and physically connected to the shield ring 230. The connecting protrusion 113 of the main housing 110 may slide and be inserted into the shield ring opening 235. In this case, the shield ring arms 236 may be engaged with a stepped portion recessed from an upper side of the connecting protrusion 113 of the main housing 110, and such a mechanical shape of the connecting protrusion 113 and the shield ring 230 may prevent the shield ring 230 from being detached downward.

In addition, in a connected state, a side surface of the connecting protrusion 113 in contact with the shield ring arms 236 may include an opening formed to allow the shield case 210 disposed inside to be exposed to the outside. Through the opening of the connecting protrusion 113, at least a portion of the exposed side portion of the shield case 210 may contact the shield ring arms 236 of the shield ring 230 by sliding and being connected thereto, and the shield case 210 may thereby be electrically connected to the shield ring 230. In this case, the shield ring fastening portion 237 may fix the shield ring arms 236 to the connecting protrusion 113 to prevent it from sliding in an opposite direction and being detached in a state in which the shield ring 230 and the connecting protrusion 113 are connected. Thus, the shield ring fastening portion 237 may be formed in a shape that may be mechanically engaged with a stepped portion formed on the upper surface of the connecting protrusion 113. The shape of the shield ring fastening portion 237 is not limited to the shape illustrated in FIG. 15, but may include all mechanical shapes that allow the shield ring fastening portion 237 to be engaged with the stepped portion of the connecting protrusion 113 to be fixed thereto, preventing a slide in a lateral direction. For example, the shield ring fastening portion 237 may include a protrusion protruding downward to be fixed while being engaged with a groove recessed on an upper surface of the stepped portion of the connecting protrusion 113.

Figure 16:
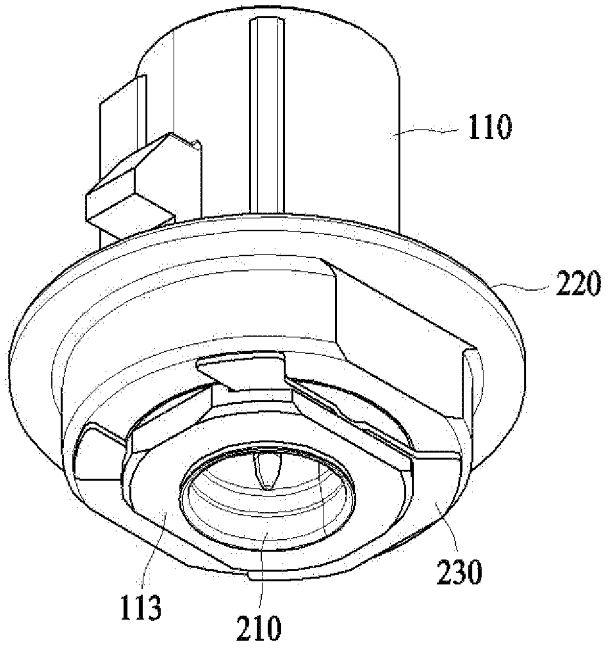
FIG. 16 is a perspective view of a connector assembly in which a main housing, a base plate, and a shield ring are connected according to an exemplary embodiment.

FIG. 16 is a perspective view of a connector assembly in which a main housing, a base plate, and a shield ring are connected according to an example embodiment. Referring to FIG. 16, the shield ring 230 connected and fixed to the connecting protrusion 113 through sliding may function as a support that prevents the main housing 110 from being separated from the base plate 220. That is, an upper surface of an outer end of the shield ring 230 formed in a preset shape may support upward a lower surface of the base plate 220. Thus, the shield ring 230 may be connected to the connecting protrusion 113 under the main housing 110 to be fixed to the main housing 110, and the base plate 220 may be fixed to the main housing 110 through a mechanical structure of the shield ring 230 fixed to the main housing 110. Thus, the main housing 110, the base plate 220, and the shield ring 230 may be securely and mutually fixed.

Figure 17:
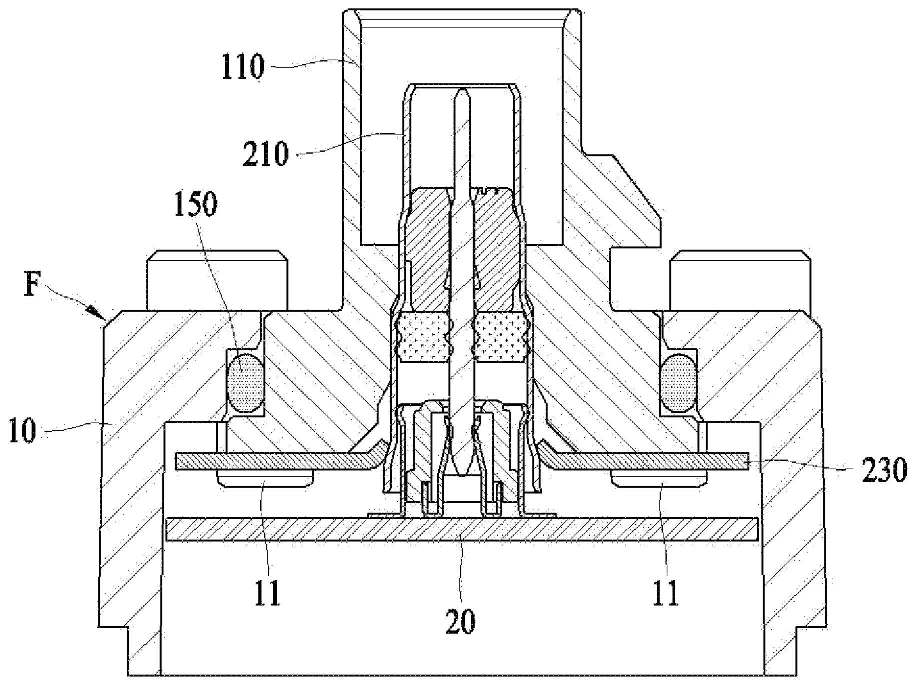
FIG. 17 is a cross-sectional view of a connector assembly based on a fourth fixing mechanism according to an exemplary embodiment.

FIG. 17 is a cross-sectional view of a connector assembly based on a fourth fixing mechanism according to an example embodiment. Referring to FIG. 17, the frame body 10 of a metal frame F may include a plurality of frame body protrusions 11 formed to pass through the shield ring 230. The frame body protrusions 11 may pass through the shield ring 230 to be clinched and may thereby fix the shield ring 230 and components disposed on the shield ring 230.

Figure 18:
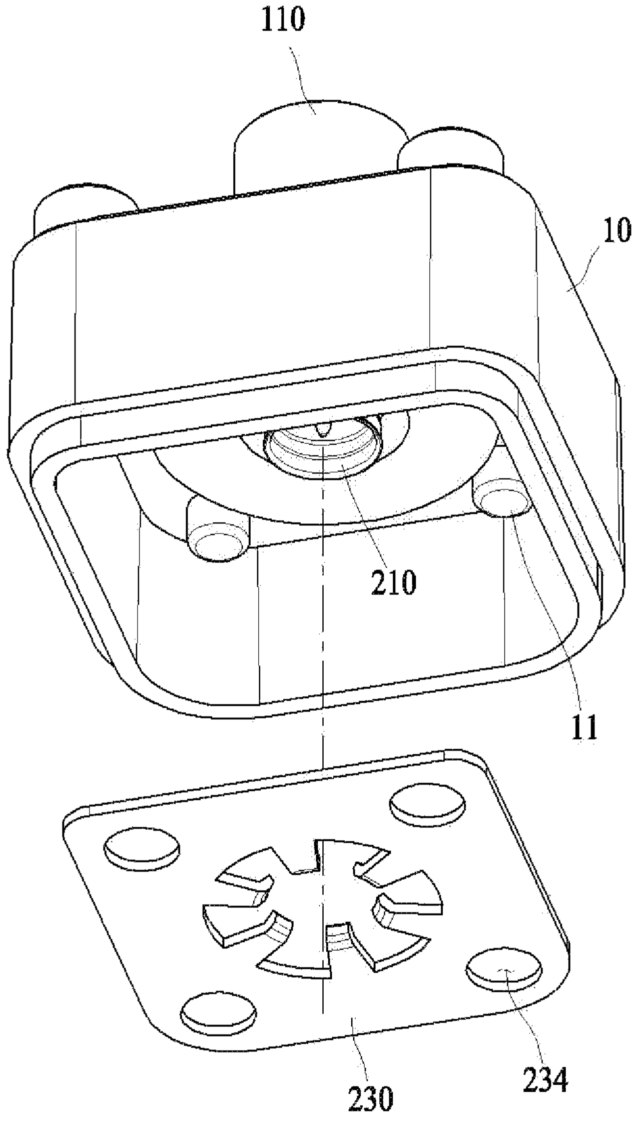
FIG. 18 is an exploded perspective view illustrating a state in which a frame body, a main housing, and a shield ring of a connector assembly are to be connected through a fourth fixing mechanism according to an exemplary embodiment.

FIG. 18 is an exploded perspective view illustrating a state in which a frame body, a main housing, and a shield ring of a connector assembly are to be connected through a fourth fixing mechanism according to an example embodiment. Referring to FIG. 18, the shield ring 230 connected to a lower side of the frame body 10 may include a plurality of shield ring holes 234 formed to pass through the frame body protrusion 11. The shield ring 230 may be connected directly to the frame body 10 to fix the main housing 110 disposed on the shield ring 230. The shield ring 230 may be fixed to the frame body 10 as the shield ring holes 234 and the frame body protrusion 11 are connected.

Figure 19:
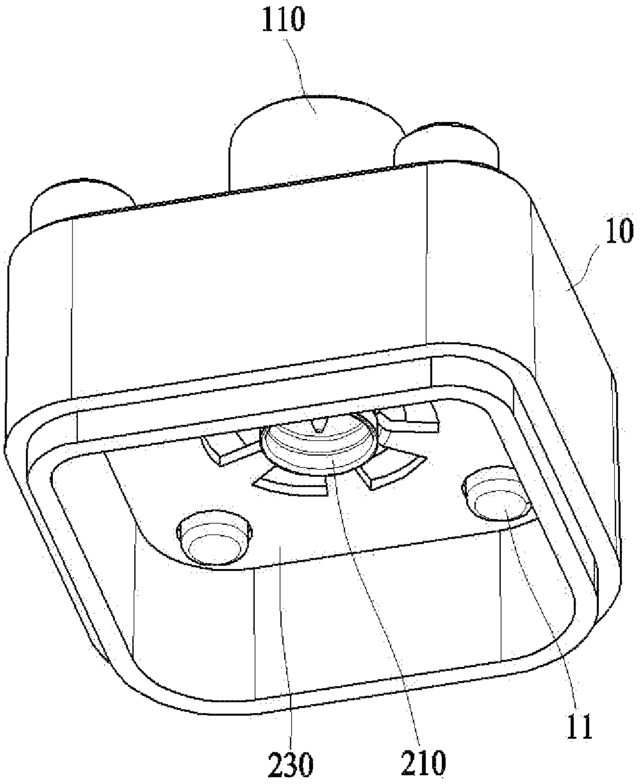
FIG. 19 is a perspective view illustrating a shape of a shield ring connected to a frame body according to an exemplary embodiment.

FIG. 19 is a perspective view illustrating a shape of a shield ring connected to a frame body according to an example embodiment. Referring to FIG. 19, the frame body protrusions 11 may be respectively coupled to the shield ring holes 234 formed on the shield ring 230 connected to the frame body 10 to pass therethrough. In this case, the shield case 210 may pass through a central portion of the connected shield ring 230 and be disposed to protrude from a lower side of the shield ring 230.

Figure 20:
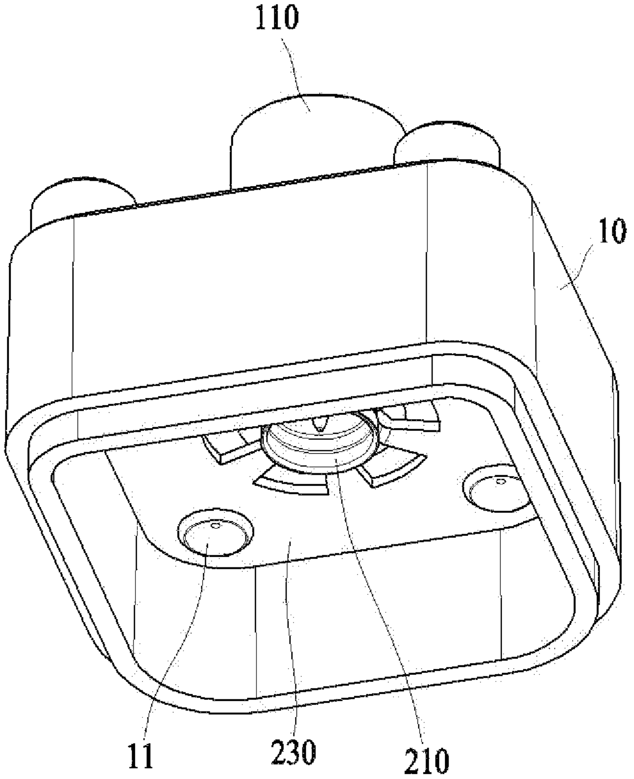
FIG. 20 is a perspective view illustrating a shape of a frame body protrusion clinched by passing through a shield ring according to an exemplary embodiment.

FIG. 20 is a perspective view illustrating a shape of a frame body protrusion clinched by passing through a shield ring according to an example embodiment. Referring to FIG. 20, the frame body protrusion 11 protruding to a lower side of the shield ring 230 may be clinched to be deformed. The frame body protrusion 11 deformed as clinched may securely fix the shield ring 230 to prevent the shield ring 230 from being detached downward. In this case, the main housing 110 disposed on the fixed shield ring 230 may be fixed as being constrained between the frame body 10 and the shield ring 230. In addition, the shield case 210 and the frame body 10 may be electrically connected through the shield ring 230.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A connector assembly, comprising:
- a main housing formed from a non-metal material;
- a shield case disposed inside the main housing;
- a base plate adapted to be connected to a metal frame; and
- a shield ring connected to the main housing and the base plate and adapted to electrically connect the metal frame to the shield case, a main housing body of the main housing is disposed on the shield ring.

2. The connector assembly of claim 1, further comprising the metal frame, the main housing is fixed to the metal frame by a mutual fixing force between the base plate and the shield ring.

3. The connector assembly of claim 2, wherein the shield ring and the base plate are connected through welding.

4. The connector assembly of claim 3, further comprising a cover disposed under the shield ring and fixed to the main housing.

5. The connector assembly of claim 4, wherein the cover and the main housing are connected through welding.

6. The connector assembly of claim 3, wherein a screw thread is provided on each of an inner surface of the main housing and an inner surface of the base plate.

7. The connector assembly of claim 2, wherein the main housing comprises a connecting protrusion protruding from a lower end of the main housing and to which the shield ring is connected, the shield ring supporting a lower surface of the base plate.

8. The connector assembly of claim 2, wherein the base plate and the metal frame are integrally formed.

9. The connector assembly of claim 2, wherein the metal frame comprises a frame body protrusion protruding from an inner surface of the metal frame to which the shield ring is connected, the shield ring including a shield ring hole receiving the frame body protrusion.

10. The connector assembly of claim 2, wherein the base plate comprises:
- a plate body surrounding the main housing; and
- a rib protruding outward from the plate body, overlapping the metal frame, and connected to the metal frame through welding.

11. The connector assembly of claim 1, wherein the shield ring defines a space for receiving the shield case in a central portion of the shield ring, and is physically and electrically connected to the shield case.

12. The connector assembly of claim 11, wherein the shield ring comprises:

a shield ring body contacting the base plate and the shield case; and a shield ring protrusion extending from an inner end of the shield ring body and contacting the shield case.

13. The connector assembly of claim 12, wherein the shield ring protrusion has a shape slanted with respect to the shield ring body.

14. The connector assembly of claim 12, wherein the main housing comprises:

a main housing protrusion protruding from the main housing body and passing through the shield ring.

15. The connector assembly of claim 11, wherein the shield ring comprises a shield ring opening formed on one side.

16. The connector assembly of claim 1, further comprising a seal disposed between the main housing and the base plate.

17. The connector assembly of claim 16, wherein the main housing defines a groove formed into a surface facing the base plate and receiving the seal therein.

18. A connector assembly, comprising:

a metal frame;

a main housing formed from a non-metal material;

a shield case disposed inside the main housing;

a base plate adapted connected to the metal frame; and a shield ring connected to the main housing and the base plate and electrically connecting the metal frame to the shield case, the metal frame includes a frame body protrusion protruding from an inner surface thereof to which the shield ring is connected, the shield ring defining a shield ring hole receiving the frame body protrusion.

19. The connector assembly of claim 18, wherein the main housing is arranged between the base plate and the shield ring for fixing the main housing to the metal frame.

20. A connector assembly, comprising:

a main housing formed from a non-metal material;

a shield case disposed inside the main housing;

a base plate adapted to be connected to a metal frame, the base plate includes a plate body and a rib, the plate body surrounds the main housing, the rib protrudes outward from the plate body, overlaps the metal frame, and is connected to the metal frame; and a shield ring connected to the main housing and the base plate and adapted to electrically connect the metal frame to the shield case.

21. A connector assembly, comprising:

a main housing formed from a non-metal material;

a shield case disposed inside the main housing;

a base plate adapted to be connected to a metal frame;

a shield ring connected to the main housing and the base plate and adapted to electrically connect the metal frame to the shield case; and a seal disposed between the main housing and the base plate, the main housing defines a groove formed into a surface facing the base plate and receiving the seal therein.

* * * * *